United States Patent [19]
Vinsani

[11] 3,824,462
[45] July 16, 1974

[54] DEVICE FOR TESTING PRINTED CIRCUIT BOARDS

[75] Inventor: Mario Vinsani, Milano, Italy

[73] Assignee: Honeywell Information Systems Italia, Caluso, Italy

[22] Filed: Feb. 23, 1973

[21] Appl. No.: 335,276

[30] Foreign Application Priority Data
Mar. 3, 1973   Italy.................................. 21344/72

[52] U.S. Cl............. 324/73 PC, 324/158 F, 324/51
[51] Int. Cl............................................ G01r 31/02
[58] Field of Search..... 324/73, 73 PC, 158 F, 72.5, 324/51

[56] References Cited
UNITED STATES PATENTS
3,723,867   3/1973   Canarutto...................... 324/73 PC Primary Examiner—Alfred E. Smith
Assistant Examiner—Rolf Hille
Attorney, Agent, or Firm—Fred Jacob

[57] ABSTRACT

A device is provided for testing printed circuit boards on which electronic components such as integrated circuit units are to be mounted. While in the device, the board is submitted to a test program suitable for testing the bonds with the electronic components mounted thereon, however, if a failure is detected, it is known to reside in the printed circuit of the board, rather than the components, and the test results aid in locating it.

7 Claims, 6 Drawing Figures

FIG. 3

DEVICE FOR TESTING PRINTED CIRCUIT BOARDS

BACKGROUND OF THE INVENTION

The present invention relates to a device for testing printed circuit boards for mounting electronic components, and more specifically the printed circuit boards for the mounting of integrated circuit units used by modern techniques in most electronic devices, especially for electronic data processing apparatus.

The visual inspection of the finished board, and the circuits printed thereon, to make sure of their correct execution is usually unsuitable and unreliable, due to the complexity and density of the printed wire connections carried by such boards.

On the other hand, the method is known which consists of checking the efficiency of each printed wire board, complete with the circuit units mounted thereon, by devices suitable for generating a testing program, that is, a sequence of signal patterns applied in succession to the input terminals of the board under test, and for comparing each output signal pattern with the corresponding expected output signal pattern. Any discrepancy between the expected and actual output signal pattern indicates an error in the operation, due to a failure which can usually be localized within a definite boundary.

Such a device is illustrated by the Italian Pat. No. 845,225 filed Oct. 10, 1968, and owned by the application. These devices are very useful in locating the cause of a failure appearing in an operating apparatus, and also for checking in the factory, the correct operation of complete boards mounted with electronic components or integrated circuit units. It is, however, convenient to avoid mounting these electronic elements on boards having defective printed circuitry, to prevent being forced either to discard boards complete with electronic elements, or to unsolder and recover these elements before discarding the defective board.

Test devices have been built, and are used, for checking the circuits printed on a board, prior to mounting the electronic elements (integrated circuit units or discrete components) thereon. These devices comprise a high number of elastic feelers, applied to predetermined points of the printed circuit, usually to the connection pads. By a suitable program, the conditions of electrical insulation or continuity of each pad with respect to each one of all other pads are tested. Each result is compared to the corresponding conditions existing, in a plurality of terminals, each one corresponding to a single pad, connected together by a number of conductors simulating the connections between pads.

In other apparatus, the insulation or continuity conditions between each pad, and each one of the other pads, are automatically checked and registered, during the test of a reference board carrying a supposedly correct printed circuit. The set of data relating to such conditions is memorized, and compared to the set of data obtained in the same way from the boards which are subsequently tested, to make sure that the printed connection of the tested boards match the connections of the reference board.

The first arrangement necessitates a great deal of work for testing boards with different types of printed circuits; the second one does not detect the systematic errors which may affect the reference circuit and which appear on all boards: neither can it detect possible errors affecting the drawing of the original circuit pattern, nor those which may take place during the execution of the photographic artwork derived therefrom. In either case, a testing program must be written especially for this testing purpose.

These, and other disadvantages, are obviated by the device according to the invention, which provides a simple and reliable apparatus suitable for testing the operational correctness of the printed connections, before mounting the electronic elements of the circuit.

It has, in addition, the advantage of utilizing the same testing program which is being used for testing the whole circuit for testing the printed circuit, complete with electronic elements and, in such case, the same computer which carries out this test.

SUMMARY OF THE INVENTION

The device according to the invention comprises substantially a rigid plate of insulating material, provided with a set of elastic feelers, occupying positions corresponding to the positions of the pads which are assigned in the circuit under test, to receive the terminal pins of the electronic elements; a device for accomodating in a predetermined position a board carrying the printed board under test, for connecting the input-output terminal of the printed board to an external device, and for pressing said board against said plate, in such a way, as to cause the feelers to come into contact with the pads; a plurality of electronic elements having the terminal connected at least to a number of said feelers, said electronic elements thus completing all circuits printed on the type of board under test. An electronic test apparatus, connected to the input-output terminals of the board under test submits the board to a testing program suitable for testing the printed circuits completed with the related electronic elements, and checking their operation. In case of defective operation, the fault should reside in a defect of the printed circuit, and the results of the test will help to locate it. The test program is, conveniently, the same test program provided for testing the operation of the board completed with its electronic elements. Switching and plugging arrangements will conveniently be provided for allowing an easy and rapid substitution of the electronic elements connected to the feelers, in order to adjust the testing apparatus to the different types of printed circuit to be tested.

BRIEF DESCRIPTION OF THE DRAWING

In the following description of a preferred embodiment reference is made to the attached drawings, wherein.

DESCRIPTION OF THE PREFERRED EMBODIMENT

Figure 1:
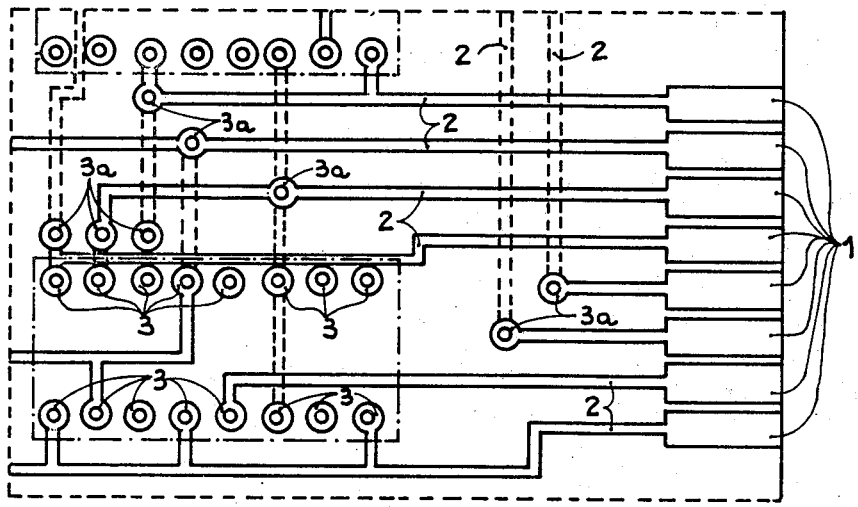
FIG. 1 shows a portion of a printed circuit for integrated units.

FIG. 1 schematically shows a portion of a printed circuit board for integrated circuit units. The following elements may be distinguished therein: the connection terminals 1 forming the connection pins of a multiple contact connector, which will be plugged into a multiple contact socket for connecting the board to an external circuit; leads 2 printed on both faces of the board, usually prevailingly according to two directions mutually perpendicular, and drawn in order to connect together, as desired, the connection terminals 1 to the connecting pins of the electronic elements to be mounted on the board, and, finally, the pads 3 and 3a, each provided with a central hole; of these, the pads indicated by reference numeral 3 are assigned to receive the connection pins of the said electronic elements for soldering them and the pads indicated by 3a serve only the purpose of connecting together portions of leads printed on opposite faces of the board.

In the test device according to the invention, it is sufficient to provide means for contacting the connecting pads 3. Usually, the locations of such pads are arranged according to a pattern valid for all boards conforming to the same circuit standard. In particular, they will be arranged in groups in such a way as to correspond in spatial relation and mutual distances, to the spatial relation and mutual distances of the connecting pins of the integrated circuit units pertaining to said standard. In the described example it is assumed that said integrated units are of the type usually called "dual in line," wherein the connecting pins are arranged in two rows of seven, or eight pins, the distances between the rows being 300 mils, (7,62 mm), and the distance between adjacent pins in each row being 100 mils, (2,54 mm). Accordingly, the connecting pads for the pins are grouped in groups of 14 or 16 pads, having the same spatial arrangement and mutual distances. The groups themselves are arranged in equidistant rows, and, in each row, separated by equal intervals.

Figure 2:
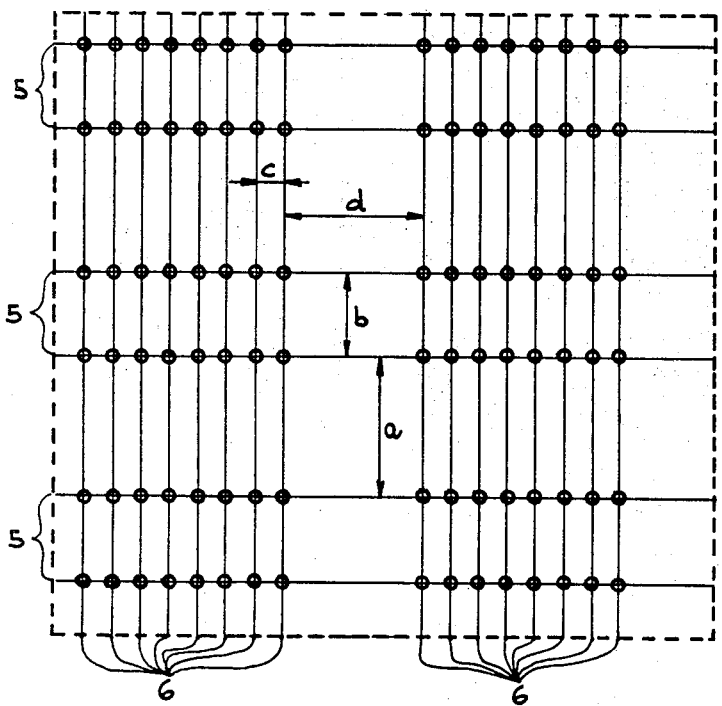
FIG. 2 is the reticular pattern of the connection pads, for a given circuit standard.

It follows that, in a printed board following such standard, all possible connecting pads are located at the crosspoints of a network, a portion of which is represented by FIG. 2, comprising pairs of parallel lines 5 at a mutual distance indicated by b, whereas the distance a occurs between the external lines of each pair, and lines 6, perpendicular to lines 5, grouped in groups of 7, or 8, lines at a mutual distance indicated by c, whereas a distance "d" occurs between the external lines of two consecutive groups. According to the standard of the example, distances "a" and "d" are 500 mils (12,7 mm), distance "b" is 300 mils, (7,62 mm) and distance "c" is 100 mils (2,54 mm).

It is self evident that, for a different standard, the network connecting pads will be a different one. However, it will generally be possible to define a rule inherent to the spatial distribution of the connecting pads on the board, and to determine, according to such rule, a network defining all points which correspond to all possible connecting pads for a given standard.

It may occur that, in addition to the pads used for connecting integrated circuit units, the board also contains a number of discrete components, as for instance, resistors and capacitors. Usually, such discrete components are located in well defined regions of the board, and it will be possible to establish an additional network integrated that of FIG. 2 and defining other crossing points corresponding to possible connecting pads for discrete components. In the worst case, it should be necessary to consider a complete network generated by mutually orthogonal lines at a mutual distance "c" (for instance 100 mils, that is 2,54 mm.), their crossing points corresponding to all possible pad positions. Among these, only the crossing points used for connection pads, and not those for simply passing through the board, will be chosen.

However, it may be noted that the modern trend is for also enclosing the discrete elements, suitably grouped, in packages having the same characteristics as to dimensions and location of pins, as the integrated circuit units, thus facilitating the automatic assembling of all elements forming the circuit. Therefore, it may be assumed that in the great majority of cases, all the connecting pads will belong to a network as the one indicated by FIG. 2.

Figure 3:
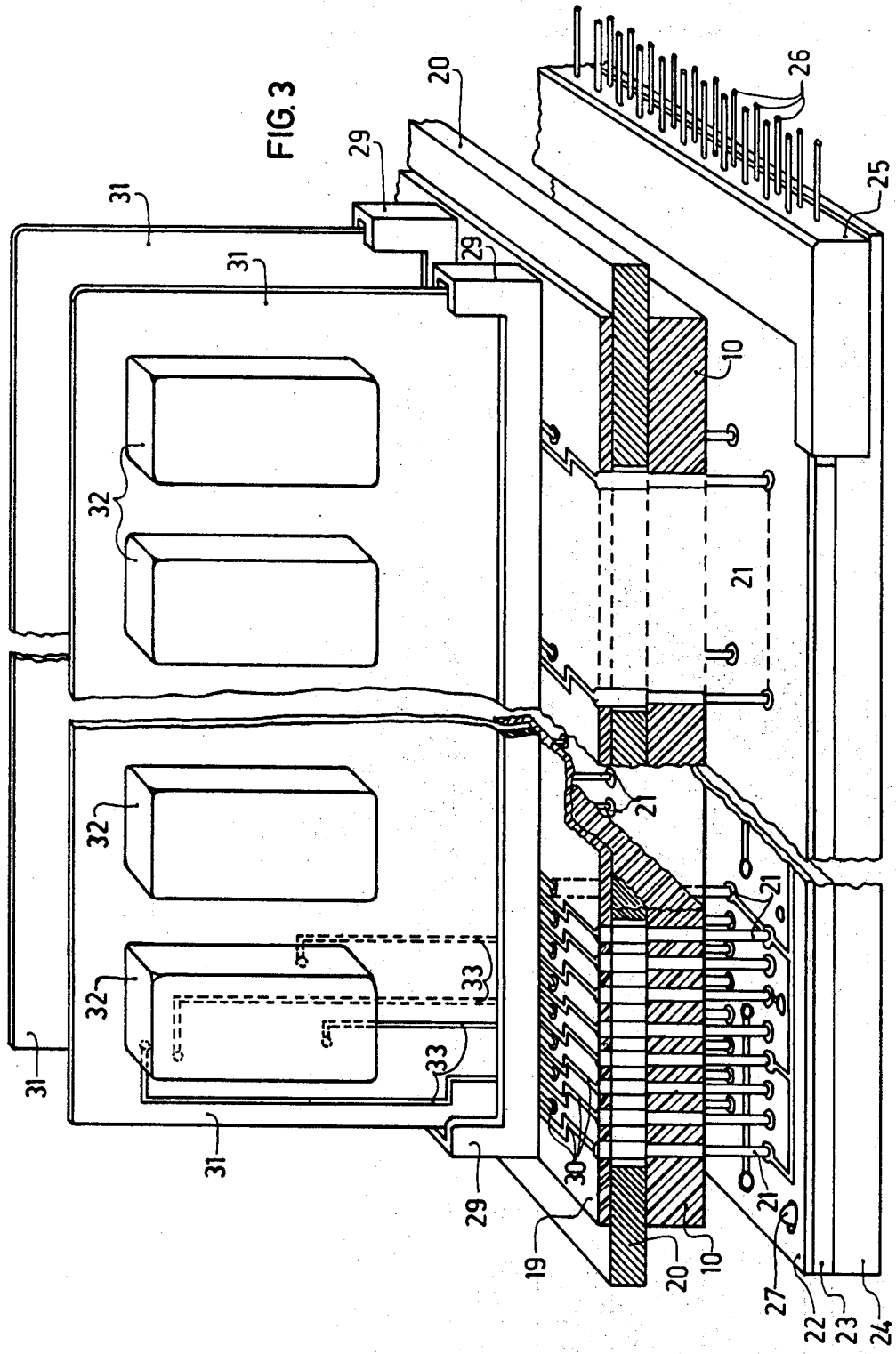
FIG. 3 is the schematic and partial perspective representation of the device carrying the board feelers and the circuit elements according to the invention.

According to a preferred embodiment, as partially represented by FIG. 3, the device of the invention essentially comprises a fixed plate 10, of insulating material, into which holes according to the reticular pattern of FIG. 2 are bored. Elastical feelers of known design are located in these holes, these feelers comprising an external metal jacket which is forced for a suitable distance into the insulating plate 10, and which contains the elastic element comprising a small tube, closed at one end, a spiral spring and a pointer 21 terminating in a suitably shaped point, and which can retract into the tube, against the action of the spring.

The upper end of the jacket may be soldered to a connecting wire, or, as shown in FIG. 2, it may terminate in a hole of a printed circuit board 19, and be soldered to a lead 30 connected to said hole.

In the arrangement of FIG. 3 a steel plate 20 is interposed between the insulating plate 10 and the upper printed circuit board 19, for supporting and stiffening the whole assembly. The steel plate 20 is suitably recessed in correspondence with the rows of feelers, in order to avoid contact with them.

The printed circuit board 22 under test is laid, with the interposition of an insulating layer 23, on a metallic plate 24 which also carries at the right end of FIG. 3, the connector 25 provided with the terminals 26. The board edge, provided with the connecting terminals, is plugges into this connector 25. The means for fastening the connector 25 to the plate 24 are such, as to leave a suitable degree of clearance for the connector, in order to facilitate the plugging of the board 22 and to avoid applying any stress to the same. The board 22 is kept in the desired position by reference pins 27, entering into precisely punched holes in the board.

By a device not indicated in FIG. 3, and already known in the art, the plate 24 is pushed against the fixed plates 20 and 10, in such a way, that each of the feelers comes into contact with one of the connecting pads of the board, as indicated by FIG. 3, where the plate 24 is represented in the final upper position.

Special connectors having a small distance between adjacent contacts are located on the board 19, and, as indicated in FIG. 3, they extend for the whole width of the board, prependicularly to its connector, and parallel to the pairs of pad rows of distance "b," in correspondence of the interval between the rows. Such connectors comprise as many contacts as the connecting pads of both pairs of rows between which each is located, and such contacts are connected, by leads 30 printed on board 19, to the feelers 21, each contact of such connectors being connected to a single one feeler. Each one of said connectors 29 may accommodate a special board 31, on which integrated circuit units 32 are fixed. The terminals of these units are connected singularly and independently to the contacts of the special connectors 29, by means of leads 33, only part of which is represented, and, through these contacts, to the feelers 21. Therefore, if the integrated units 32 are the same as the units which, in the completed board, are connected to the connecting pads of the board 22, it is clear that, by means of these pads, the feelers 21, leads 30, contacts of connectors 29 and leads 33, the integrity of the completed circuit, as it will be mounted finally on the board, is provisionally restored. Therefore, when, by means of a testing program applied to terminals 26 of the connector 25, the correct operation of the circuit is checked, this will indicate that the printed leads on the board do not present such defects as to impair its operation, and the board itself may be accepted as correct. On the contrary, an indication of a fault, as offered by the testing program, will allow one to locate, with greater or lesser precision, the region of the circuit where the fault is located. As it is assumed that the integrated unit mounted on boards 31, and their connections, are operating faultlessly, the fault will be located in a connection or in a well defined group of connections of the printed board. The correct operation of the integrated units on boards 31, and their connection, should have been checked by preliminary tests.

At this point, the defective board may be submitted to visual inspection to determine the nature of the defect for either correcting the same, or discarding the printed board.

In that particular case, where each connection terminal on one face of the board is electrically connected with the corresponding one on the opposite face, as may happen in the case where the number of connections to the external circuitry is reduced, the operation of positioning the board under test may be made easier by leaving out the connector 25 and substituting for it a row of additional feelers located on the plate 21, in such a way, that each one of them makes contact with one of the connecting terminals. These feelers are connected to the external apparatus for emitting and receiving the test signals.

Also in the case of separate connecting terminals on both faces, a similar solution may be applied, predisposing on the plate 24 elastic members for making contact with the terminals on the lower face of the board, in addition to the above indicated additional rows of feelers to make contact with the connecting terminals on the upper face.

In case the integrated circuit units, instead of being provided with pins for entering the holes of the pads, have small blades for soldering to corresponding plane terminals on the printed circuit, and assuming that, as usual, the location and dimensions of such terminals conform to thenorms of the adopted standard, nothing need be changed on the device according to the invention, with the exception that feelers having a contact point of a shape better suitable for making contact with a plane surface may be adopted.

Figure 4:
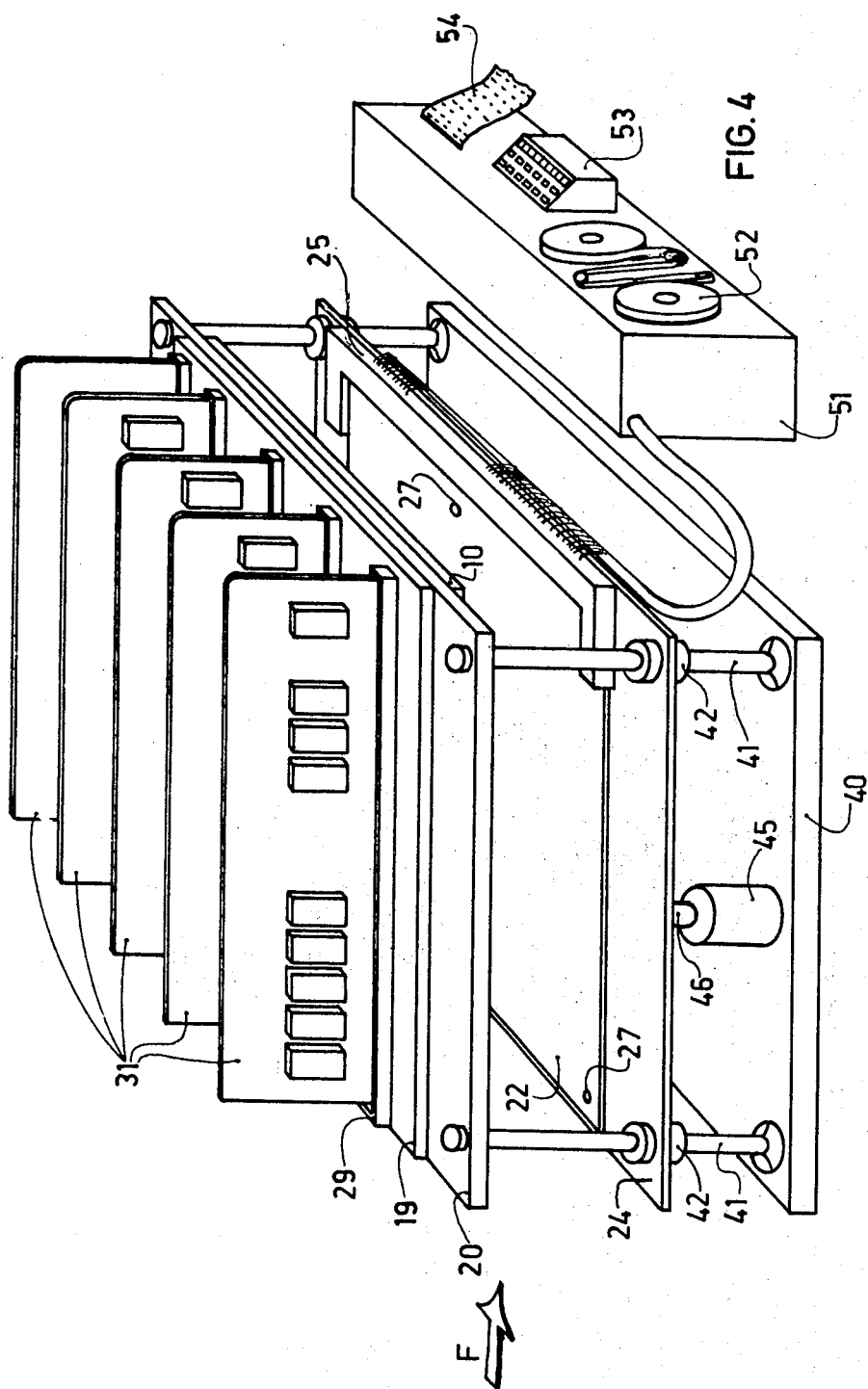
FIG. 4 is the schematic and perspective representation of the essential parts of the complete device according to the invention.

FIG. 4 shows, schematically, the whole apparatus according to the invention. Four vertical posts 41 are fixed to a base plate 40 and carry, at their upper end, the steel plate 20 which in turn the insulating plate 10, carrying the feelers and the board 29 are fastened.

Four collars 42 may slide along these posts, and the plate 24, which in turn carries the connector 25 and supports the board under test is fastened to these collars. The board is introduced into the device along the direction of the arrow F, so that the contacts of the connectors take hold of its connecting terminals, and its position is determined by the reference pins 27. It may be suitable, in order to facilitate the introduction of the board into the connector, to use for this purpose a connector of the "cam" type, in which the connector contacts are maintained in the open position for facilitating the introduction of the board, and are subsequently closed by a manual or automatic operation, for ensuring the contact.

When the board under test is in the correct position, a suitable device operates the uplifting of the plate 24, pushing the board against the feelers.

This lifting device may be any one of different types. In the example of FIG. 4 it is represented by two hydraulic cylinders located on the sides of the device, (only cylinder 45 is visible) which act on two pistons (such as piston 46), lifting the plate. It is evident that such a device may, according to preference, be comprised of an electromechanical arrangement (such as an electromagnet); or a mechanical system, such a motor-operated screw-and-nut system, or also, a simple manual device.

The arrangement represented in FIG. 4 is related to the testing of a board, which follows a construction standard providing room for 10 rows of integrated circuit units, and six units per row. The board 19 carries five special boards 31, plugged into the special connectors 29, each one of them having 96 contacts. Therefore, each board 31 may support 12 integrated units with 16 pins each, corresponding to the 12 integrated units which may be connected to the pads arranged in thw two double rows with which the feelers connected to each special connector come into contact. However, in general, not all the places provided for the circuit units on the board under test will be occupied, and consequently, as indicated in FIG. 4, not all of the special boards 31 will be complete with 12 circuit units.

The connector 25, into which the board under test is plugged, has its contacts connected, through a multiple flexible cable, to the electronic testing apparatus 51 comprising, in general, a device 52 for the read out of a magnetic tape, a control and supervision console 53, possibly a printer 54 for printing the signs suitable for indicating the presence of a fault, and for locating the same. The magnetic tape carries a test program, which is the same as that used for testing the boards completed with the electronic elements.

The arrangement shown in FIG. 4, providing five special boards, each one capable of accommodating 12 integrated units, appears to be a reasonable compromise between two opposite requirements: that of permitting a quick substitution of the integrated units carried by the board 19, in order to easily adapt the same for testing different types of printed wire boards, and the other, of avoiding the need to store a large number of integrated circuit units mounted on special boards. According to the amount of different types of printed wire boards having the same constructive standard, to the quantity of board per each type, and to the number and type of the integrated units mounted on said boards, the optimal solution may shift either toward grouping a greater number of integrated units of fewer special boards, or towards the opposite direction.

Figure 5:
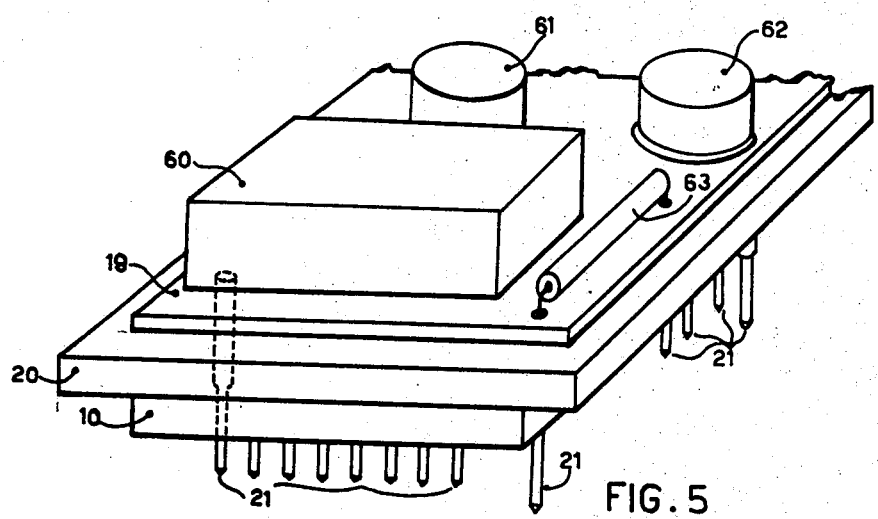
FIGS. 5 and 6 shows two variants in the arrangement of the electronic elements of the plates.

In an extreme case, if only one, or very few types of printed wire boards have to be tested, and if there is a greater number of boards per each type, it may be useful to adopt an arrangement, by which the integrated circuit units provided for testing a board are directly soldered to the upper ends of the feeler. Such arrangement is schematically indicated in FIG. 5, representing a portion of plates 19, 20 and 10. The connecting pins of the integrated unit 60, of two discrete components (transistors) 61 and 62, and of a resistor 63 are directly soldered to the upper ends of the feeler 21. This arrangement has the drawback that, changing the type of the board to be tested, the whole plate 20, with the integrated units and components soldered on the same, must be changed: and therefore as many different plates, complete with feelers and electronic elements must be provided as there are types of boards to be tested. This arrangement however has some advantages in that the connecting pins of the electronic elements are directly connected to the feelers without any interposed plug-and-contact connection, the length of the connections is not very different from that of the real circuit, and, finally, as each plate is assigned to a single type of printed circuit, there are no modularity requirements and therefore discrete components and non-integrated electronic elements may be mounted on the plate together with integrated units, as shown by FIG. 5.

Figure 6:
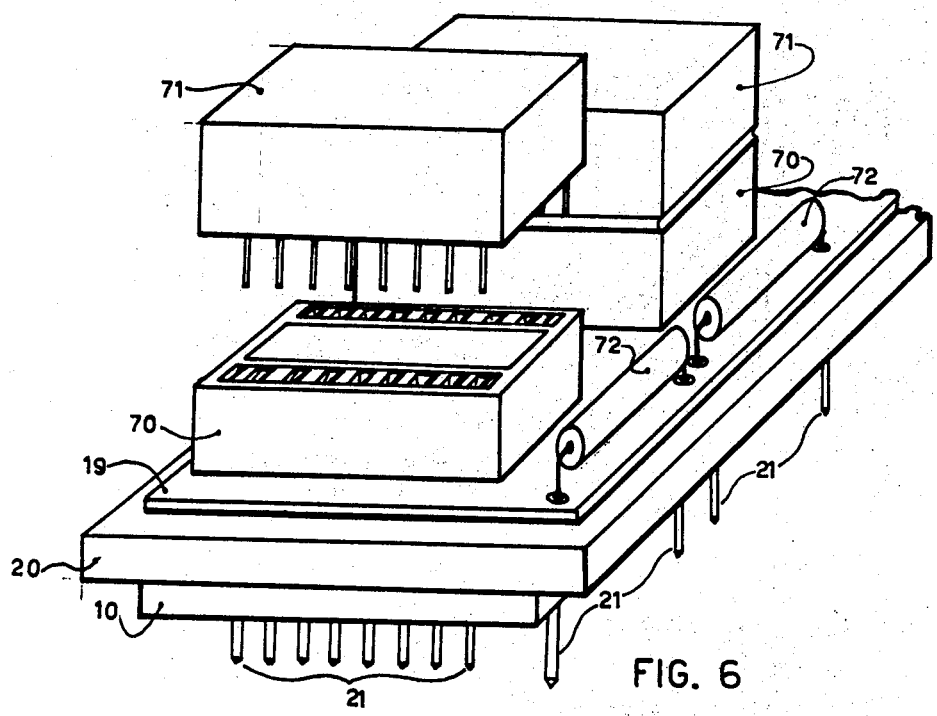

The opposite type of arrangement is shown in FIG. 6. In this case, the upper ends of the feelers are soldered to the terminals of individual sockets 70, known and commercially available, which are provided with contacts into which integrated circuit units 71 may be plugged as indicated. In this case, for changing the type of board under test, it will usually be necessary to change a plurality of integrated units plugged into the sockets. The operation therefore may require some time, and is liable to produce errors. To counterbalance this, the number of integrated units which must be stored for plugging on the plate, is a minimum. Some discrete components, such as filtering capacitors 72, which ar located in a fixed position with reference to the integrated units to which they are usually associated, may, in this case, be directly soldered to the associated feelers, as shown.

In any case, contained between these extremes, the number of the special boards and of the circuit units mounted on each of them will be established according to considerations of convenience, depending, as stated, on the characteristics and quantity of the boards to be tested.

With the described arrangement the connections between integrated units are longer than those existing on the boards, when the elements are directly mounted thereon. Usually this does not cause any variance in the operation of the circuit, if care is taken in carrying out the test at a speed somewhat slower than the operating speed, thus eliminating the effect that the less steep fronts, due to the longer connections, could have on the operation of the circuit.

In special cases, when the circuits comprise delay elements having a delay value critical with respect to the operating speed, the reduced-speed operation could present some disadvantages. However, in this case, it is easy to check whether the discrepancies between expected results and effective results are due to the reduced operation speed, or to a fault of the printed circuit. Suitable electronic means may then be employed and mounted in connection with the affected integrated units, to suitably modify the operation time of said circuit elements.

Generally, it will be convenient to use, as electronic elements mounted on the special boards for completing the circuit, elements equivalent to these which will be mounted on the complete printed circuit board. In some cases it may be suitable to employ different elements, for instance discrete components in place of integrated circuits, provided that the resulting circuit at the speed at which is operated, produce the same operational characteristic as the completed circuit.

The correct operation of the device according to the invention may be checked before beginning the test operation on a set of boards of the same type, by using a reference board, which by means of an accurate visual inspection has proved to be exempt from accidental faults in the printed circuit, such as smudges, breakages, short-circuits between adjacent conductors, and so on.

Introducing this reference board into the apparatus, and carrying out the test, the positive result of the test is proof that the device is operating correctly. If the result is negative, that is, an operational defect is detected, this may happen, either because some integrated circuit unit mounted on the apparatus, or some contact, or connection thereof, is faulty, or because the printed circuit support used as a reference is affected by a systematic error, due to the photographic artwork or the original drawing.

In any case, suitable steps may be taken. Attention is drawn to the fact that any systematic error of the circuit, which is very difficult to detect by visual inspection, is revealed by the test, contrary to what may happen with other apparatus of the prior art.

For clarity, in FIG. 4 it has been assumed that the control and test apparatus 51 is a separate specific device. However, it is possible, and in many cases will be convenient for controlling the device according to the invention, and for operating the test procedure, to employ a general purpose electronic computer, using it for sending to the boards under test a diagnostical program for detecting and locating, within certain boundaries, any possible fault. As stated, the computer, the diagnostic program, and the procedures for detecting and locating the faults may conveniently be the same as that, used for testing the printed circuit boards complete with electronic components and integrated circuit units.

It is obvious that variants and modifications of the described apparatus may be carried out by anyone skilled in the art without departing from the spirit and scope of the invention.

What is claimed is:

1. A device for testing printed circuit boards, provided for mounting thereon electronic circuit elements for building up an operating set of circuits having predetermined functional characteristics, comprising:
   primary contact means for contacting predetermined pads on the printed circuits, said pads being assigned for connection to said electronic circuit elements, said primary contact means for providing connection of said pad to suitable electronic circuit elements for building up, in association with the circuits printed on the board under test, a set of operating circuits having substantially the same functional characteristics of said operating set of circuits;

auxiliary contact means for contacting the terminals provided for external connection on the printed circuit board under test, said auxiliary contact means being connected to diagnostic means suitable for checking the correct operation of said set of operating circuits.

2. The device for testing printed circuit boards of claim 1, wherein said electronic circuit elements connected to said primary contact means are substantially identical to the electronic circuit elements provided for mounting on said printed circuit board.

3. The device of claim 1, wherein said electronic circuit elements are removably connected to said primary contact means.

4. The device of claim 2, wherein said electronic circuit elements are removably connected to said primary contact means.

5. The device of claim 1, wherein said electronic circuit elements are fixedly connected to said primary contact means, being comprised together with said primary contact means in a removable sub-unit of said device.

6. The device of claim 2, wherein said electronic circuit elements are fixedly connected to said primary contact means, being comprised, together with said primary contact means in a removable sub-unit of said device.

7. A method for testing printed circuit boards, provided for mounting thereon electronic circuit elements for building up an operating set of circuits having predetermined functional characteristics, comprising the following steps:

electrically contacting a plurality of terminals for external connection of the printed circuit board under test with auxiliary contact means for connecting the printed circuit board with an external diagnostical device;

electrically contacting a plurality of predetermined pads of the printed circuit board under test with primary contact means connected with suitable circuit elements for building up, in association with the circuits provided on the board under test, a set of operating circuits having substantially the same functional characteristics of said operating set of circuits;

sending a suitable sequence of signals on part of said plurality of terminals by means of said diagnostical device, at least part of the remaining terminals of said plurality of terminals being connected to known means for checking that said set of operating circuits is operating in substantial accordance with said predetermined functional characteristics.

* * * * *